(12) United States Patent
Kendrick et al.

(10) Patent No.: US 11,102,426 B1
(45) Date of Patent: Aug. 24, 2021

(54) PHOTONIC INTEGRATED CIRCUIT FOR HETERODYNE IMAGING

(71) Applicant: LOCKHEED MARTIN CORPORATION, Bethesda, MD (US)

(72) Inventors: Richard Lee Kendrick, San Mateo, CA (US); Alan Lee Duncan, Broken Arrow, CA (US)

(73) Assignee: Lockheed Martin Corporation, Bethesda, MD (US)

( * ) Notice: Subject to any disclaimer, the term of this patent is extended or adjusted under 35 U.S.C. 154(b) by 0 days.

(21) Appl. No.: 15/984,279

(22) Filed: May 18, 2018

(51) Int. Cl.
| | |
|---|---|
| *H04N 5/33* | (2006.01) |
| *H04N 5/225* | (2006.01) |
| *H04N 5/378* | (2011.01) |
| *G02B 23/00* | (2006.01) |
| *G02B 6/12* | (2006.01) |

(52) U.S. Cl.
CPC ......... *H04N 5/332* (2013.01); *G02B 6/12021* (2013.01); *G02B 23/00* (2013.01); *H04N 5/2256* (2013.01); *H04N 5/378* (2013.01); *G02B 2006/12138* (2013.01); *G02B 2006/12164* (2013.01)

(58) Field of Classification Search
None
See application file for complete search history.

(56) References Cited

U.S. PATENT DOCUMENTS

| | | | | |
|---|---|---|---|---|
| 7,724,991 | B1* | 5/2010 | Doerr ................. | G02B 6/12004 385/14 |
| 8,913,859 | B1* | 12/2014 | Duncan ................... | G02B 6/06 356/477 |
| 9,754,985 | B1* | 9/2017 | Duncan ............. | H01L 27/14627 |
| 2010/0119230 | A1* | 5/2010 | Terada ................. | H04B 10/691 398/79 |
| 2010/0322631 | A1* | 12/2010 | Nagarajan .......... | G02B 6/12004 398/65 |
| 2012/0269516 | A1* | 10/2012 | Liu ...................... | H04B 10/506 398/72 |
| 2013/0170833 | A1* | 7/2013 | Nagarajan ............... | H04J 14/02 398/48 |

(Continued)

OTHER PUBLICATIONS

Berroth et al. "Efficient Coupling between Optical Fibers and Photonic Integrated Circuits" (Year: 2014).*

(Continued)

*Primary Examiner* — Mohammed Jebari
(74) *Attorney, Agent, or Firm* — Morgan, Lewis & Bockius LLP

(57) ABSTRACT

An apparatus includes a first light source to produce a first reference light, a first pair of arrayed waveguide gratings (AWGs) to demultiplex a first optical signal and the first reference light, respectively, into multiple first signal beams and multiple first reference beams. A first heterodyne optical detector can mix the multiple first signal beams and the multiple first reference beams to generate first quadrature optical signals. A first pair of photo-detectors can convert the first quadrature optical signals to first in-phase (I) and quadrature (Q) electrical signals. The apparatus is implemented as a photonic integrated circuit (PIC) incorporating the first pair of AWGs, the first heterodyne optical detector and the first pair of photo-detectors.

14 Claims, 5 Drawing Sheets

(56) References Cited

U.S. PATENT DOCUMENTS

| | | | |
|---|---|---|---|
| 2014/0341564 A1* | 11/2014 | Westlund | H04B 10/614 |
| | | | 398/16 |
| 2014/0376000 A1* | 12/2014 | Swanson | G01B 9/02091 |
| | | | 356/479 |
| 2017/0195062 A1* | 7/2017 | Evans | H01S 5/02453 |
| 2019/0109564 A1* | 4/2019 | Kanter | H03D 7/163 |

OTHER PUBLICATIONS

Nicolas et al. "Real-time full-field arbitrary optical waveform measurement" (Year: 2010).*

Guifang Li "Recent advances in coherent optical communication" (Year: 2009).*

O. Guyon "Wide field interferometric imaging with single-mode fibers" (Year: 2002).*

Dai et al., "Monolithically integrated 64-channel silicon hybrid demultiplexer enabling simultaneous wavelengthand mode-division-multiplexing" (Year: 2015).*

Daoxin Dai, "Silicon photonic integrated devices for multi-channel multiplexed on-chip optical interconnects" (Year: 2015).*

* cited by examiner

PHOTONIC INTEGRATED CIRCUIT FOR HETERODYNE IMAGING

STATEMENT REGARDING FEDERALLY SPONSORED RESEARCH OR DEVELOPMENT

Not applicable

FIELD OF THE INVENTION

The present invention generally relates to electro-optical imaging, and more particularly, to photonic integrated circuit (PIC) for heterodyne imaging.

BACKGROUND

Segmented planar imaging detector for electro-optical reconnaissance (SPIDER) is an imaging system formed with waveguide arrays and other components needed to combine light from separate optical collectors, such as telescopes or lenslets. The SPIDER can achieve the performance capability needed by a number of space missions in a radically compressed and low mass and/or power package. The SPIDER has been used in a heterodyne imaging system, which leverages the SPIDER concept to develop photonics enabled heterodyne electro-optical phased array (HEOPA). The heterodyne detection uses a number of hardware and electronic modules and has been demonstrated in the RF and infrared region (e.g., $\lambda$ in a region of about 10 µm) of the spectrum. The HEOPA imager comprises a densely packed interferometer array based on photonic integrated circuit (PIC) technologies that sample the object being imaged in the spatial-frequency domain and then reconstruct an image. The HEOPA imager, however, is not fully integrated on a single PIC and includes a number of discrete components and/or devices such as a local oscillator and a balanced detector along with a PIC interferometer.

SUMMARY

According to various aspects of the subject technology, methods and configurations for providing a photonic integrated circuit (PIC) for heterodyne imaging are described. The disclosed PIC is more compact and uses lower power compared to existing discrete solutions, and has the potential of being used in telecom applications in visible and near infra-red (IR) wavelengths.

In one or more aspects, an apparatus includes a first light source to produce a first reference light, a first pair of arrayed waveguide gratings (AWGs) to demultiplex a first optical signal and the first reference light, respectively, into multiple first signal beams and multiple first reference beams. A first heterodyne optical detector can mix the multiple first signal beams and the multiple first reference beams to generate first quadrature optical signals. A first pair of photo-detectors can convert the first quadrature optical signals to first in-phase (I) and quadrature (Q) electrical signals. The apparatus is implemented as a photonic integrated circuit (PIC) incorporating the first pair of AWGs, the first heterodyne optical detector and the first pair of photo-detectors.

In other aspects, a method includes producing, by a first light source, a first reference light and demultiplexing, by a first pair of AWGs, a first optical signal and the first reference light, respectively, into multiple first signal beams and multiple first reference beams. The method further includes mixing, by a first heterodyne optical detector, the multiple first signal beams and the multiple first reference beams to generate first quadrature optical signals. The method further includes converting, by a pair of first photo-detectors, the first quadrature optical signals to first I and Q signals. The first pair of AWGs, the first heterodyne optical detector and the first pair of photo-detectors are incorporated in a PIC.

In yet other aspects, a heterodyne imaging system includes a light source configured to produce a first reference light and a second reference light. A first and a second pair of arrayed waveguide gratings (AWGs) can respectively demultiplex a first and a second optical signal and the first and the second reference light, respectively, into multiple first and second signal beams and multiple first and second reference beams. A first and a second heterodyne optical detector can respectively mix the multiple first and second signal beams and the multiple first and second reference beams to respectively generate first and second quadrature optical signals. A first and a second pair of photo-detectors are used to respectively convert the first and the second quadrature optical signals to first and second I and Q electrical signals. The first and second pair of AWGs, the first and second heterodyne optical detector and the first and second pair of photo-detectors are incorporated in a PIC.

The foregoing has outlined rather broadly the features of the present disclosure in order that the detailed description that follows can be better understood. Additional features and advantages of the disclosure will be described hereinafter, which form the subject of the claims.

BRIEF DESCRIPTION OF THE DRAWINGS

For a more complete understanding of the present disclosure, and the advantages thereof, reference is now made to the following descriptions to be taken in conjunction with the accompanying drawings describing specific aspects of the disclosure, wherein.

DETAILED DESCRIPTION

The detailed description set forth below is intended as a description of various configurations of the subject technology and is not intended to represent the only configurations in which the subject technology can be practiced. The appended drawings are incorporated herein and constitute a part of the detailed description. The detailed description includes specific details for the purpose of providing a thorough understanding of the subject technology. However, it will be clear and apparent to those skilled in the art that the subject technology is not limited to the specific details set forth herein and can be practiced using one or more implementations. In one or more instances, well-known structures and components are shown in block diagram form in order to avoid obscuring the concepts of the subject technology.

The present disclosure is directed, in part, to systems and configurations for providing a photonic integrated circuit (PIC) for heterodyne imaging. The PIC of the subject technology provides a compact and low power solution that can be used in telecom applications, for example, in visible and near infra-red (IR) wavelengths, which are of interest in building interferometric imaging systems with significantly enhanced spatial resolution at these wavelengths. The disclosed solution is a telecommunications PIC that incorporates the telescope optical beam combination and heterodyne detection to create an imaging system. The telescope can be a segmented planar imaging detector for electro-optical reconnaissance (SPIDER) described in the U.S. Pat. No. 8,913,859 B1, entitled "Segmented Planar Imaging Detector for Electro-Optic Reconnaissance," which is incorporated in its entirety by reference herein. In some implementations, the PIC of the subject technology may incorporate segments of the SPIDER, for example, the lenslets in the integrated circuit.

In a heterodyne imaging system, the signals from two telescopes (e.g., SPIDER) are mixed with laser lights at different frequencies to create heterodyne signals by the interference of the telescope signals and the respective laser lights. The heterodyne signals are optical signals and are detected by two separate photodetectors, where electrical heterodyne signals are generated. One electrical heterodyne signal is delayed before the two electrical heterodyne signals are correlated in a correlator and processed by a processor to produce a fringe power and mutual intensity estimate. The PIC of the subject technology can incorporate the majority of the implementation hardware for the heterodyne imaging system.

Figure 1A:
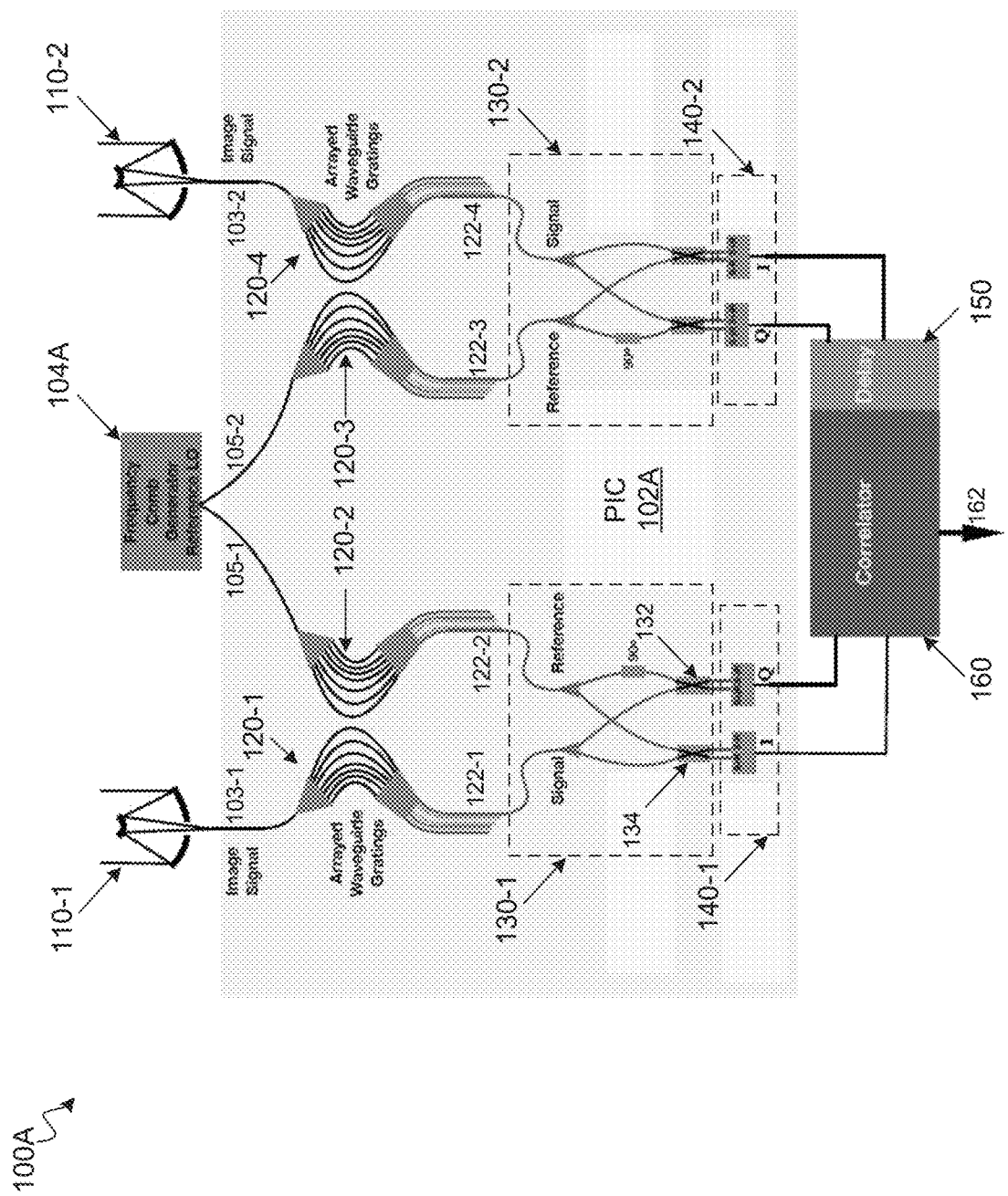
FIG. 1A is a schematic diagram illustrating an example of a heterodyne imaging system implemented using a photonic integrated circuit (PIC), according to certain aspects of the disclosure.

FIG. 1A is a schematic diagram illustrating an example of a heterodyne imaging system 100A implemented using a photonic integrated circuit (PIC) 102A, according to certain aspects of the disclosure. The heterodyne imaging system 100A includes telescopes 110-1 and 110-2, a light source 104A, a first pair of arrayed waveguide gratings (AWGs) 120-1 and 120-2 and a second pair of AWGs 120-3 and 120-4, a first and a second heterodyne optical detector 130-1, 130-2, a first and a second pair of photodetectors 140-1 and 140-2, a delay circuit 150 and a correlator 160. In the implementation of the heterodyne imaging system 100A shown in FIG. 1A, the telescopes 110-1 and 110-2, the light source 104A, the delay 150 and the correlator 160 are discrete components (e.g., off the PIC 102A), whereas all other components are implemented as part of the PIC 102A.

The telescopes 110 can be SPIDERs that generate image signals 103-1 and 103-2, respectively. A SPIDER includes a number of pairs of lenslets and a number of photonic waveguides. The lenslets with their associated waveguides couple light from a distant object into the PIC 102A. The waveguides are typically arranged as a two-dimensional array. Light from each lenslet can be distributed among different waveguides by both field angle and optical frequency, and the lenslets can be paired up to form unique interferometer baselines by combining light from different waveguides. In one or more implementations, portions of the telescopes 110, for example, micro-lenses and segments of their associated waveguides can be incorporated with the PIC 102A.

In one or more implementations, the light source 104A can be a laser source such as a comb generator that can generate two or more reference signals, known as, local oscillator (LO) signals. In the example shown in FIG. 1A, the light source 104A generates two reference signals (e.g., LO) 105-1 and 105-2 with different frequencies (e.g., in the GHz range). Each of the reference signals 105-1 and 105-2 may include a number of wavelengths, which are separated by the AWGs 120-2 and 120-3. An AWG is a phased-array gapless spectral demultiplexer consisting of two slab waveguide star couplers connected by a dispersive waveguide array. The light propagated in the input waveguide will be coupled into the waveguide array via the first star coupler. In the waveguide array, the optical path length difference between adjacent array arms equals an integer multiple of the operating wavelength of the demultiplexer. This causes interference of the optical signals from different arms at the output slab waveguide, which results in demultiplexing the frequency components (e.g., wavelengths) of the reference signals 105-1 and 105-2 and generating multiple first reference beams 122-2 and 122-3.

Similarly, the AWGs 120-1 and 120-4 demultiplex image signals 103-1 and 103-2 of the telescopes 110-1 and 110-2 into their respective optical wavelengths to generate multiple first signal beams 122-1 and multiple second signal beams 122-4. The heterodyne detector 130-1 and 130-2 are known blocks, such as balanced quadrature coherent receivers that can perform optical heterodyne detection. In optical heterodyne detection, information encoded as modulation of the phase and/or frequency (wavelength) of electromagnetic radiation in the wavelength band of an input signal are extracted. The input signal can be a light signal in the visible or near infrared (IR) region, which are of interest in building interferometric imaging systems with significantly enhanced spatial resolution. In some aspects, the first heterodyne detector 130-1 can mix the multiple first signal beams 122-1 and the multiple first reference beams 122-2 to generate first quadrature optical signals that are provided to the first pair of photodetectors 140-1. Similarly, the second heterodyne detector 130-2 can mix the multiple second signal beams 122-4 and the multiple second reference beams 122-3 to generate second quadrature optical signals that are provided to the second pair of photodetectors 140-2.

Each of the heterodyne detectors 130 includes a 90° optical hybrid coupler 132 that can combine a signal (S, e.g., 122-1) with a reference (R, e.g., 122-2) with a 90° phase shift to generate S+jR and S−jR signals. Another coupler 134 couples the signal (S) with the reference (R) to generate S+R and S−R signals. The S+jR and S−jR are a portion of the first quadrature optical signals that are passed to a photodetector of the photo detector pairs 140-1. The other portion includes S+R and S−R signal that are passed to another photodetector of the photo detector pairs 140-1. The second heterodyne detector 130-2 is similar to the first heterodyne detector 130-1 and generate similar S+jR and S−jR and S+R and S−R signals for the second photodetector pair 140-2.

The photo detector pairs 140 are balanced photo-detectors that can convert optical signals to electrical signals. For example, the first photo detector pair 140-1 can convert the first quadrature optical signals generated by the first heterodyne detector 130-1 into first electrical in-phase (I) and quadrature (Q) signals. For example, S+R and S−R signals are converter to the I signal, and the S+jR and S−jR signals are converted to the Q signal. Similarly, the second photo detector pair 140-2 can convert the second quadrature optical signals generated by the second heterodyne detector 130-2 into second electrical I and Q signals. The electrical I and Q signals provided by the first photo detector pair 140-1 are transmitted via electrical conductive media (e.g., wires) to the correlator 160. The electrical I and Q signals provided by the second photo detector pair 140-2 are transmitted via electrical conductive media (e.g., wires) to a delay circuit 150 and from there to the correlator 160.

In the implementation shown in FIG. 1A, the delay circuit 150 and the correlator 160 are discrete components that are provided off the PIC 102A and are coupled via suitable wiring to I and Q output ports of the first and second photo detector pairs 140-1 and 140-2. The correlator 160, in some implementations, is a digital correlator and can extract multiple frequency domain phase and amplitude functions in the form of the output signal 162. The output signal 162 is further processed by a processor (not shown for simplicity) that process the multiple frequency domain phase and amplitude functions to reconstruct an image. The image reconstruction may involve correcting for linear distortions of the first quadrature optical signals and the second quadrature optical signals, and properly combining the first I and Q electrical signals and the delayed second I and Q electrical signals with correct respective phases and amplitudes.

Figure 1B:
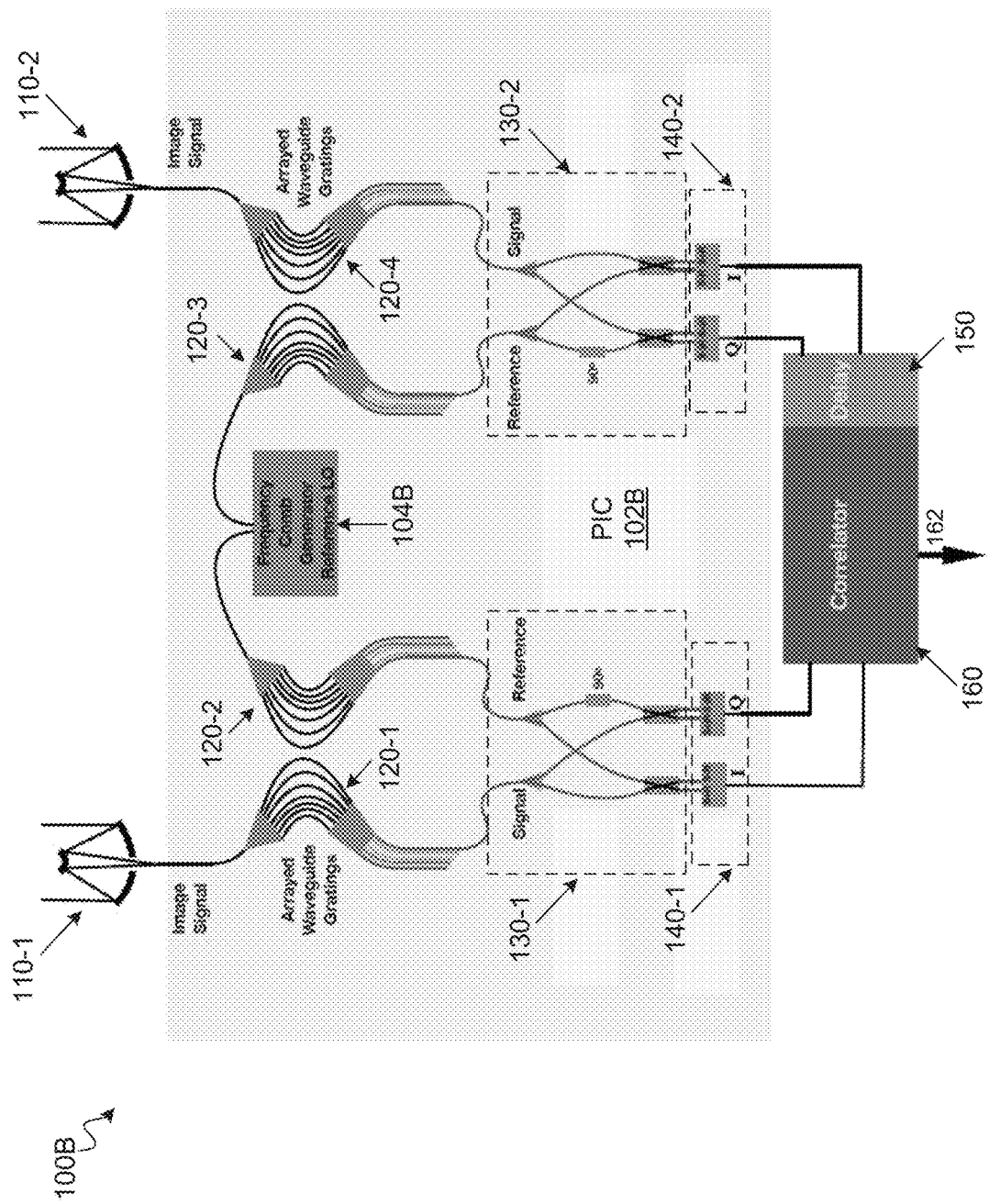
FIG. 1B is a schematic diagram illustrating an example of a heterodyne imaging system implemented using a PIC, according to certain aspects of the disclosure.

FIG. 1B is a schematic diagram illustrating an example of a heterodyne imaging system 100B implemented using a PIC 102B, according to certain aspects of the disclosure. The heterodyne imaging system 100B is similar to that heterodyne imaging system 100A of FIG. 1A in the sense that it includes the telescopes 110-1 and 110-2, a light source 104B, the first pair of array arrayed waveguide gratings (AWGs) 120-1 and 120-2 and the second pair of AWGs 120-3 and 120-4, the first and a second heterodyne optical detector 130-1, 130-2, the first and the second pair of photodetectors 140-1 and 140-2, the delay circuit 150 and the correlator 160. The difference between the two system is in the light source 104B, which is incorporated in the PIC 102B, whereas the light source 104A was a discrete light source. The light source 104B may have some structural differences with the discrete light source 104A, for example, being more compact, but the functionality of the light source 104B would be similar to the functionalities of the light source 104A, as described above. The integration of the light source 104B with the PIC 102B can result in a more compact, lower power, and less costly heterodyne imaging system 100B, as compared to the heterodyne imaging system 100A of FIG. 1A.

Figure 1C:
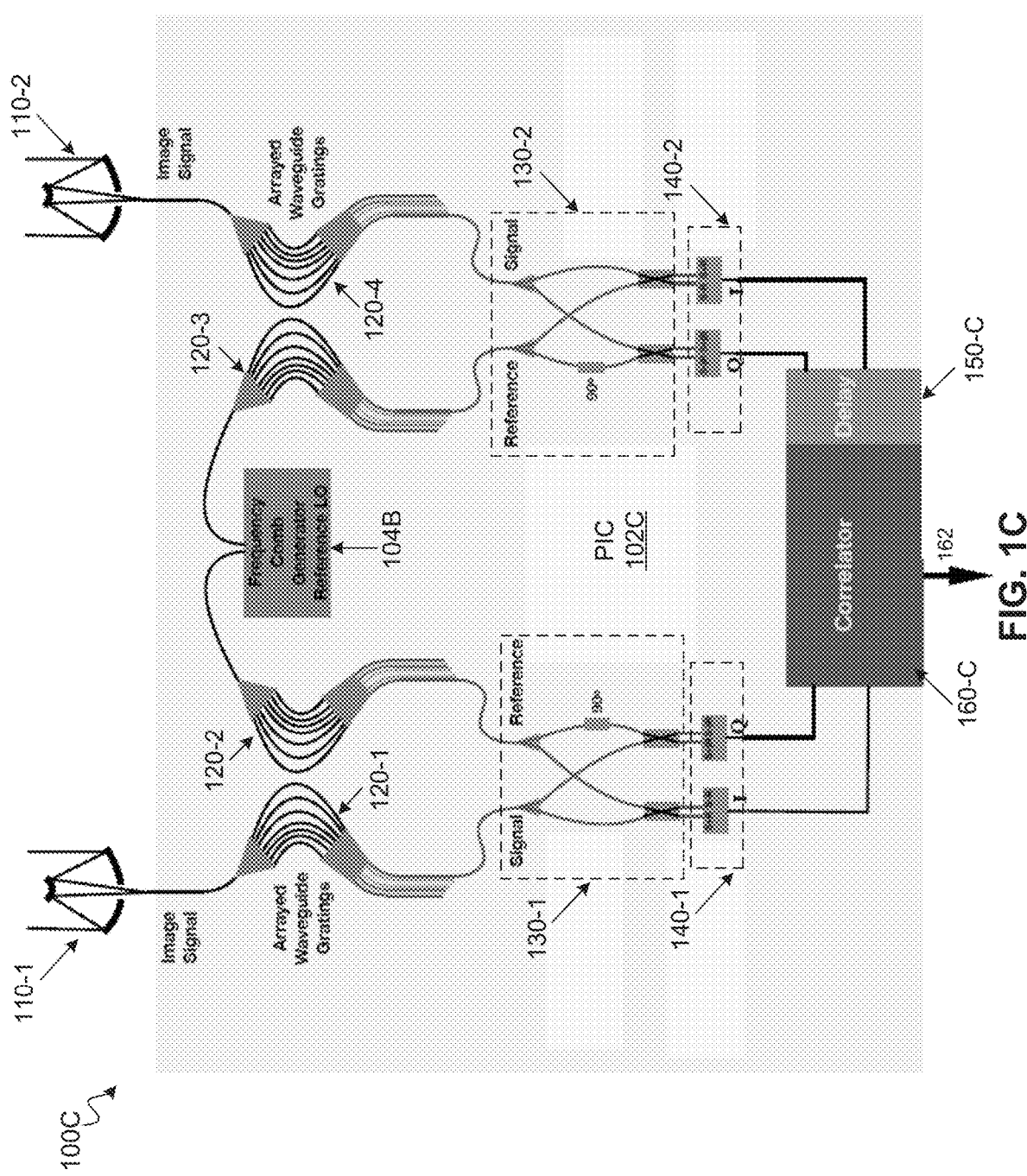
FIG. 1C is a schematic diagram illustrating an example of a heterodyne imaging system implemented using a PIC, according to certain aspects of the disclosure.

FIG. 1C is a schematic diagram illustrating an example of a heterodyne imaging system 100C implemented using a PIC 102C, according to certain aspects of the disclosure. The heterodyne imaging system 100C is similar to that heterodyne imaging system 100B of FIG. 1B in the sense that it includes the telescopes 110-1 and 110-2, the light source 104B, the first pair of array arrayed waveguide gratings (AWGs) 120-1 and 120-2 and the second pair of AWGs 120-3 and 120-4, the first and a second heterodyne optical detector 130-1, 130-2, the first and the second pair of photodetectors 140-1 and 140-2, the delay circuit 150 and the correlator 160. The difference between the two system is in the delay circuit 150-C and the correlator 160C, which are incorporated in the PIC 102C, whereas the delay circuit 150-C and the correlator 160C were discrete components. The delay 150-C and the correlator 160C may have some structural differences with their discrete versions (e.g., delay 150 and the correlator 160 of FIG. 1B), for example, being more compact, but the functionality of the delay 150-C and the correlator 160C would be similar to the functionalities of the delay 150 and the correlator 160, as described above. The incorporation of the delay 150-C and the correlator 160C with the PIC 102C can may lead to a heterodyne imaging system 100C that is more compact, consumes less power, and is less costly than the heterodyne imaging system 100B of FIG. 1B.

It is understood that in certain implementations, the functionalities of the AWGs 120-2 and 120-3 may be incorporated into the light source 104A of FIG. 1A or 104B. In those implementations, these light sources can be realized as frequency comb generators that are capable of directly generating the multiple first and second reference beams 122-2 and 122-3 of FIG. 1A.

Figure 2:
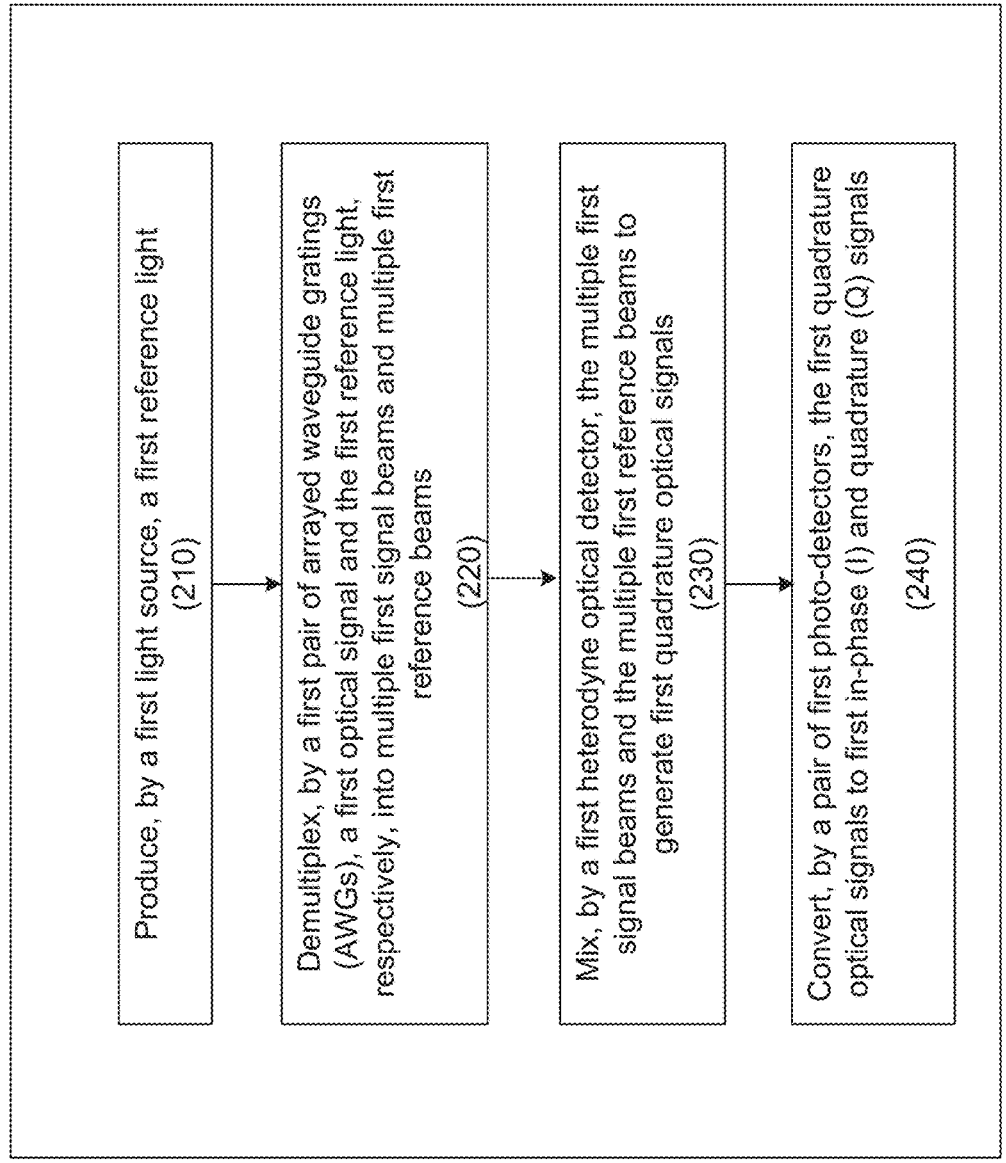
FIG. 2 is a flow diagram illustrating an example method of implementing a heterodyne imaging system using a PIC, according to some aspects of the subject technology.

FIG. 2 is a flow diagram illustrating an example method 200 of implementing a heterodyne imaging system using a PIC (e.g., PIC 102A, 102B or 102C of FIGS. 1A through 1C), according to some aspects of the subject technology. The method 200 begins by producing, using a first light source (e.g., 104A of FIG. 1A), a first reference light (e.g., 105-1 of FIG. 1A), (210). The method 200 further includes demultiplexing, using a first pair of AWGs (e.g., 120-1 and 120-2 of FIG. 1A), a first optical signal (also referred to as "image signal", e.g., 103-1 of FIG. 1A), and the first reference light, respectively, into multiple first signal beams (e.g., 122-1 of FIG. 1A), and multiple first reference beams (e.g., 122-2 of FIG. 1A), (220). A first heterodyne optical detector (e.g., 130-1 of FIG. 1A) mixes the multiple first signal beams and the multiple first reference beams to generate first quadrature optical signals (e.g., inputs to 140 of FIG. 1A) (230). A pair of first photo-detectors (e.g., 140 of FIG. 1A) converts the first quadrature optical signals to first I and Q signals (e.g., I and Q of FIG. 1A) (240). The first AWG, the first heterodyne optical detector and the first photo-detectors are incorporated in a PIC (e.g., 102A of FIG. 1A).

Figure 3:
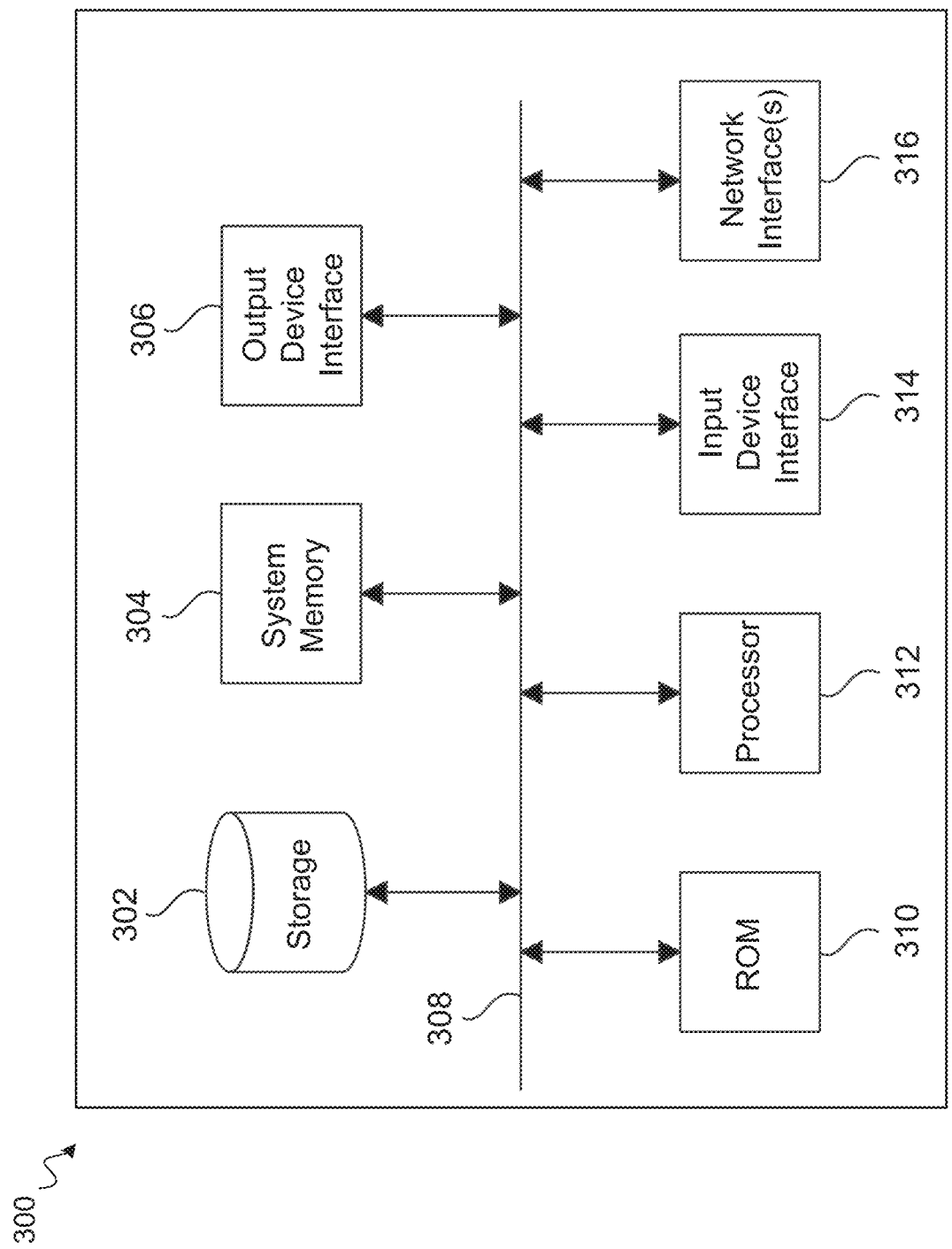
FIG. 3 is a block diagram conceptually illustrating an electronic system with which aspects of the subject technology are implemented.

FIG. 3 is a block diagram conceptually illustrating an electronic system 300 with which aspects of the subject technology are implemented. The electronic system 300, for example, can be a network device, a media converter, a desktop computer, a laptop computer, a tablet computer, a server, a switch, a router, a base station, a receiver, a phone, or generally any electronic device that transmits signals over a network. Such an electronic system 300 includes various types of computer readable media and interfaces for various other types of computer readable media. In one or more implementations, the electronic system 300 can be, and/or can be a part of a system that processes the output signal 162 from the correlator (e.g., 160 or 160C of FIGS. 1A-3A) of the subject technology. The electronic system 300 includes a bus 308, one or more processing unit(s) 312, a system memory 304, a read-only memory (ROM) 310, a permanent storage device 302, an input device interface 314, an output device interface 306, and a network interface 316, or subsets and variations thereof.

The bus 308 collectively represents all system, peripheral, and chipset buses that communicatively connect the numerous internal devices of the electronic system 300. In one or more implementations, the bus 308 communicatively connects the one or more processing unit(s) 312 with the ROM 310, the system memory 304, and the permanent storage device 302. From these various memory units, the one or more processing unit(s) 312 retrieves instructions to execute and data to process in order to execute the processes of the subject disclosure. The one or more processing unit(s) 312 can be a single processor or a multi-core processor in different implementations. In one or more implementations, one or more processing unit(s) 312 can be used to further process the output signals 162 from the correlators (e.g., 160 and 160C of FIGS. 1A-3A) of the subject technology.

The ROM 310 stores static data and instructions that are needed by the one or more processing unit(s) 312 and other modules of the electronic system. The permanent storage device 302, on the other hand, is a read-and-write memory device. The permanent storage device 302 is a non-volatile memory unit that stores instructions and data even when the electronic system 300 is off. One or more implementations of the subject disclosure use a mass storage device (such as a magnetic or optical disk and its corresponding disk drive) as the permanent storage device 302.

Other implementations use a removable storage device (such as a floppy disk, flash drive, and its corresponding disk drive) as the permanent storage device 302. Like the permanent storage device 302, the system memory 304 is a read-and-write memory device. However, unlike the permanent storage device 302, the system memory 304 is a volatile read-and-write memory, such as random access memory. System memory 304 stores any of the instructions and data that the one or more processing unit(s) 312 needs at runtime. In one or more implementations, the processes of the subject disclosure are stored in the system memory 304, the permanent storage device 302, and/or the ROM 310. From these various memory units, the one or more processing unit(s) 312 retrieves instructions to execute and data to process in order to execute the processes of one or more implementations.

The bus 308 also connects to the input device interface 314 and the output device interface 306. The input device interface 314 enables a user to communicate information and select commands to the electronic system. Input devices used with the input device interface 314 include, for example, alphanumeric keyboards and pointing devices (also called "cursor control devices"). The output device interface 306 enables, for example, the display of images generated by the electronic system 300. Output devices used with the output device interface 306 include, for example, printers and display devices, such as a liquid crystal display (LCD), a light emitting diode (LED) display, an organic light emitting diode (OLED) display, a flexible display, a flat panel display, a solid state display, a projector, or any other device for outputting information. One or more implementations may include devices that function as both input and output devices, such as a touchscreen. In these implementations, feedback provided to the user can be any form of sensory feedback, such as visual feedback, auditory feedback, or tactile feedback; and input from the user can be received in any form, including acoustic, speech, or tactile input.

Finally, as shown in FIG. 3, the bus 308 also couples the electronic system 300 to one or more networks (not shown) through one or more network interfaces 316. In this manner, the computer can be a part of one or more network of computers, such as a peer-to-peer network, a local area network ("LAN"), a wide area network ("WAN"), or an Intranet, or a network of networks, such as the Internet. Any or all components of the electronic system 300 can be used in conjunction with the subject disclosure.

Implementations within the scope of the present disclosure can be partially or entirely realized using a tangible computer-readable storage medium (or multiple tangible computer-readable storage media of one or more types) encoding one or more instructions. The tangible computer-readable storage medium also can be non-transitory in nature.

The computer-readable storage medium can be any storage medium that can be read, written, or otherwise accessed by a general purpose or special purpose computing device, including any processing electronics and/or processing circuitry capable of executing instructions. For example, without limitation, the computer-readable medium can include any volatile semiconductor memory, such as RAM, DRAM, SRAM, T-RAM, Z-RAM, and TTRAM. The computer-readable medium also can include any non-volatile semiconductor memory, such as ROM, PROM, EPROM, EEPROM, NVRAM, flash, nvSRAM, FeRAM, eTRAM, MRAM, PRAM, CBRAM, SONOS, RRAM, NRAM, racetrack memory, FJG, and Millipede memory.

Further, the computer-readable storage medium can include any non-semiconductor memory, such as optical disk storage, magnetic disk storage, magnetic tape, other magnetic storage devices, or any other medium capable of storing one or more instructions. In some implementations, the tangible computer-readable storage medium can be directly coupled to a computing device, while in other implementations, the tangible computer-readable storage medium can be indirectly coupled to a computing device, e.g., via one or more wired connections, one or more wireless connections, or any combination thereof.

Instructions can be directly executable or can be used to develop executable instructions. For example, instructions can be realized as executable or non-executable machine code or as instructions in a high-level language that can be compiled to produce executable or non-executable machine code. Further, instructions also can be realized as or can include data. Computer-executable instructions also can be organized in any format, including routines, subroutines, programs, data structures, objects, modules, applications, applets, functions, etc. As recognized by those of skill in the art, details including, but not limited to, the number, structure, sequence, and organization of instructions can vary significantly without varying the underlying logic, function, processing, and output.

While the above discussion primarily refers to microprocessor or multi-core processors that execute software, one or more implementations are performed by one or more integrated circuits, such as application specific integrated circuits (ASICs) or field programmable gate arrays (FPGAs). In one or more implementations, such integrated circuits execute instructions that are stored on the circuit itself.

Those of skill in the art would appreciate that the various illustrative blocks, modules, elements, components, methods, and algorithms described herein may be implemented as electronic hardware, computer software, or combinations of both. To illustrate this interchangeability of hardware and software, various illustrative blocks, modules, elements, components, methods, and algorithms have been described above generally in terms of their functionality. Whether such functionality is implemented as hardware or software depends upon the particular application and design constraints imposed on the overall system. Skilled artisans may implement the described functionality in varying ways for each particular application. Various components and blocks may be arranged differently (e.g., arranged in a different order, or partitioned in a different way) all without departing from the scope of the subject technology.

It is understood that any specific order or hierarchy of blocks in the processes disclosed is an illustration of example approaches. Based upon design preferences, it is understood that the specific order or hierarchy of blocks in the processes may be rearranged, or that all illustrated blocks be performed. Any of the blocks may be performed simultaneously. In one or more implementations, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

As used in this specification and any claims of this application, the terms "base station", "receiver", "computer", "server", "processor", and "memory" all refer to electronic or other technological devices. These terms exclude people or groups of people. For the purposes of the specification, the terms "display" or "displaying" means displaying on an electronic device.

The description of the subject technology is provided to enable any person skilled in the art to practice the various aspects described herein. While the subject technology has been particularly described with reference to the various figures and aspects, it should be understood that these are for illustration purposes only and should not be taken as limiting the scope of the subject technology.

A reference to an element in the singular is not intended to mean "one and only one" unless specifically stated, but rather "one or more." The term "some" refers to one or more. Underlined and/or italicized headings and subheadings are used for convenience only, do not limit the subject technology, and are not referred to in connection with the interpretation of the description of the subject technology. All structural and functional equivalents to the elements of the various aspects described throughout this disclosure that are known or later come to be known to those of ordinary skill in the art are expressly incorporated herein by reference and intended to be encompassed by the subject technology. Moreover, nothing disclosed herein is intended to be dedicated to the public regardless of whether such disclosure is explicitly recited in the above description.

Although the invention has been described with reference to the disclosed aspects, one having ordinary skill in the art will readily appreciate that these aspects are only illustrative of the invention. It should be understood that various modifications can be made without departing from the spirit of the invention. The particular aspects disclosed above are illustrative only, as the present invention may be modified and practiced in different but equivalent manners apparent to those skilled in the art having the benefit of the teachings herein. Furthermore, no limitations are intended to the details of construction or design herein shown, other than as described in the claims below. It is therefore evident that the particular illustrative aspects disclosed above may be altered, combined, or modified and all such variations are considered within the scope and spirit of the present invention. While compositions and methods are described in terms of "comprising," "containing," or "including" various components or steps, the compositions and methods can also "consist essentially of" or "consist of" the various components and operations. All numbers and ranges disclosed above can vary by some amount. Whenever a numerical range with a lower limit and an upper limit is disclosed, any number and any subrange falling within the broader range are specifically disclosed. Also, the terms in the claims have their plain, ordinary meaning unless otherwise explicitly and clearly defined by the patentee. If there is any conflict in the usages of a word or term in this specification and one or more patent or other documents that may be incorporated herein by reference, the definitions that are consistent with this specification should be adopted.

What is claimed is:

1. An apparatus comprising:
   a first light source configured to produce a first reference light;
   a second light source configured to produce a second reference light and
   a photonic integrated circuit (PIC) comprising:
     a pair of similar circuitry including four demultiplexing arrayed waveguide gratings (AWGs), a first circuitry of the pair of the similar circuitry comprising:
       a first pair of AWGs of the four AWGs configured to demultiplex a first optical signal and the first reference light, respectively, into multiple first signal beams and multiple first reference beams;
       a first heterodyne optical detector configured to mix the multiple first signal beams and the multiple first reference beams to generate first quadrature optical signals; and
       a first pair of photo-detectors configured to convert the first quadrature optical signals to first in-phase (I) and quadrature (Q) electrical signals; and
     a second circuitry of the pair of the similar circuitry comprising:
       a second pair of AWGs of the four AWGs configured to demultiplex a second optical signal and the second reference light, respectively, into multiple second signal beams and multiple second reference beams;
       a second heterodyne optical detector configured to mix the multiple second signal beams and the multiple second reference beams to generate second quadrature optical signals; and
       a second pair of photo-detectors configured to convert the second quadrature optical signals to second I and Q electrical signal;
   a delay circuit configured to delay the second I and Q electrical signals to generate delayed second I and Q electrical signals;
   a correlator configured to correlate the first I and Q electrical signals and the delayed second I and Q electrical signals to generate multiple frequency domain phase and amplitude functions; and
   a processor configured to process the multiple frequency domain phase and amplitude functions to reconstruct an image, and wherein a reconstruction is to correct for linear distortions of the first quadrature optical signals and the second quadrature optical signals, and to properly combine the first I and Q electrical signals and the delayed second I and Q electrical signals with correct respective phases and amplitudes.

2. The apparatus of claim 1, wherein the PIC further comprises the first and the second light source, and wherein the first and the second light source are implemented as a frequency comb generator.

3. The apparatus of claim 1, wherein the first and the second optical signals are provided by two telescopes, wherein each telescope comprises a segmented planar imaging detector for electro-optical reconnaissance (SPIDER), and wherein the PIC further includes lenslets of the SPIDER.

4. The apparatus of claim 1, wherein the first light source and the second light source comprise a single stable optical frequency comb generator that is configured to generate the first and the second reference lights at different wavelengths.

5. The apparatus of claim 1, wherein each of the four demultiplexing AWGs comprise a gapless spectral demultiplexer having multiple overlapping adjacent passbands.

6. The apparatus of claim 1, wherein each of the first heterodyne optical detector and the second heterodyne optical detector comprises a balanced quadrature coherent receiver.

7. A method comprising:
producing, by a first light source, a first reference light and by a second light source, a second reference light;
demultiplexing, by a first pair of arrayed waveguide gratings (AWGs) of four demultiplexing AWGs, a first optical signal and the first reference light, respectively, into multiple first signal beams and multiple first reference beams;
demultiplexing, by a second pair of AWGs of the four demultiplexing AWGs, a second optical signal and the second reference light, respectively, into multiple second signal beams and multiple second reference beams;
mixing, by a first heterodyne optical detector, the multiple first signal beams and the multiple first reference beams to generate first quadrature optical signals;
converting, by a pair of first photo-detectors, the first quadrature optical signals to first in-phase (I) and quadrature (Q) signals;
mixing, by a second heterodyne optical detector, the multiple second signal beams and the multiple second reference beams to generate second quadrature optical signals;
converting, by a pair of second photo-detectors, the second quadrature optical signals to second I and Q signals;
delaying, using a delay circuit, the second I and Q electrical signals to generate delayed second I and Q electrical signals;
correlating, using a correlator, the first I and Q electrical signals and the delayed second I and Q electrical signals to generate multiple frequency domain phase and amplitude functions; and
processing, using a processor, the multiple frequency domain phase and amplitude functions to reconstruct an image, and wherein a reconstruction includes correcting for linear distortions of the first quadrature optical signals and the second quadrature optical signals, and properly combining the first I and Q electrical signals and the delayed second I and Q electrical signals with correct respective phases and amplitudes,
wherein the four demultiplexing AWGs, the first and second heterodyne optical detectors, and the pairs of first and second photo-detectors are incorporated in a photonic integrated circuit (PIC).

8. The method of claim 7, further comprising providing the first and the second optical signals by using two telescopes, wherein each telescope comprises a segmented planar imaging detector for electro-optical reconnaissance (SPIDER).

9. A heterodyne imaging system, the system comprising:
a light source configured to produce a first reference light and a second reference light;
four demultiplexing arrayed waveguide gratings (AWGs) including a first and a second pair of AWGS configured to respectively demultiplex a first and a second optical signal and the first and the second reference light, respectively, into multiple first and second signal beams and multiple first and second reference beams;
a first and a second heterodyne optical detectors configured to respectively mix the multiple first and second signal beams and the multiple first and second reference beams to respectively generate first and second quadrature optical signals;
a first and a second pair of photo-detectors configured to respectively convert the first and the second quadrature optical signals to first and second in-phase (I) and quadrature (Q) electrical signals;
a delay circuit configured to delay the second I and Q electrical signals to generate delayed second I and Q electrical signals;
a correlator configured to correlate the first I and Q electrical signals and the delayed second I and Q electrical signals to generate multiple frequency domain phase and amplitude functions; and
a processor configured to process the multiple frequency domain phase and amplitude functions to reconstruct an image, and wherein a reconstruction is to correct for linear distortions of the first quadrature optical signals and the second quadrature optical signals, and to properly combine the first I and Q electrical signals and the delayed second I and Q electrical signals with correct respective phases and amplitudes,
wherein the four demultiplexing AWGs, the first and second heterodyne optical detectors, and the first and second pairs of photo-detectors are incorporated in a photonic integrated circuit (PIC).

10. The heterodyne imaging system of claim 9, wherein the PIC further comprises the light source, and wherein the light source is implemented as a frequency comb generator.

11. The heterodyne imaging system of claim 9, wherein the first and the second optical signals are provided by two telescopes, wherein each telescope comprises a segmented planar imaging detector for electro-optical reconnaissance (SPIDER), and wherein the PIC further includes lenslets of the SPIDER.

12. The heterodyne imaging system of claim 9, wherein the light source comprises a single stable optical frequency comb generator that is configured to generate the first and the second reference lights at different wavelengths.

13. The heterodyne imaging system of claim 9, wherein each of the four demultiplexing AWGs comprise a gapless spectral demultiplexer having multiple overlapping adjacent passbands.

14. The heterodyne imaging system of claim 9, wherein each of the first heterodyne optical detector and the second heterodyne optical detector comprises a balanced quadrature coherent receiver.

* * * * *